US012621908B2

(12) United States Patent
Robison et al.

(10) Patent No.: US 12,621,908 B2
(45) Date of Patent: May 5, 2026

(54) SELF-REGULATING HEATER CABLE WITH BUFFER LAYER

(71) Applicant: Chemelex Europe GmbH, Schaffhausen (CH)

(72) Inventors: Jennifer Robison, San Carlos, CA (US); Wade DePolo, Sunnyvale, CA (US); Sirarpi B. Jenkins, Menlo Park, CA (US); Linda D.B. Kiss, San Mateo, CA (US); Marcus Kleinehanding, Tolochenaz (CH); Paul Becker, San Carlos, CA (US)

(73) Assignee: Chemelex Europe GmbH, Schaffhausen (CH)

( * ) Notice: Subject to any disclaimer, the term of this patent is extended or adjusted under 35 U.S.C. 154(b) by 824 days.

(21) Appl. No.: 16/914,187

(22) Filed: Jun. 26, 2020

(65) Prior Publication Data

US 2020/0413496 A1     Dec. 31, 2020

Related U.S. Application Data

(60) Provisional application No. 62/866,973, filed on Jun. 26, 2019.

(51) Int. Cl.
  *H05B 3/56*          (2006.01)
  *B29C 48/00*         (2019.01)
    (Continued)

(52) U.S. Cl.
  CPC ............. *H05B 3/56* (2013.01); *B29C 48/022* (2019.02); *B29C 48/06* (2019.02); *B29C 48/154* (2019.02);
    (Continued)

(58) Field of Classification Search
  CPC ...... H05B 3/56; H05B 3/18; H05B 2203/007; H05B 2203/01; B29K 2105/16
  See application file for complete search history.

(56)          References Cited

U.S. PATENT DOCUMENTS

| | | | |
|---|---|---|---|
| 4,242,573 | A | 12/1980 | Batliwalla |
| 4,271,350 | A | 6/1981 | Croiwley |
|  |  | (Continued) | |

FOREIGN PATENT DOCUMENTS

| | | |
|---|---|---|
| CN | 207340214 U | 5/2018 |
| CN | 208277388 U | 12/2018 |
| GB | 893800 A | 4/1962 |

OTHER PUBLICATIONS http://hyperphysics.phy-astr.gsu.edu/hbase/Tables/thron.html (Year: 2018).*

(Continued)

*Primary Examiner* — Steven W Crabb
*Assistant Examiner* — Fahmida Ferdousi
(74) *Attorney, Agent, or Firm* — Quarles & Brady LLP

(57)          ABSTRACT

Embodiments of the invention provide self-regulating heater cables utilizing substantially solid polymeric buffer layers surrounding the heating elements having improved heat transfer efficiency as well as improved reliability and endurance. The assembly includes first and second power supply wires configured to carry electrical power and separated by a solid spacer, a substantially solid electrically-insulating buffer layer in thermal contact with the heating element, and a cable jacket including a polymeric outer surface and an inner metallic sheath surrounding the buffer layer and in thermal contact with the buffer layer. The buffer layer includes a polymeric material having a thermal conductivity greater than air at standard temperature and pressure and surrounds the heating element, power supply wires, and spacer.

12 Claims, 8 Drawing Sheets

(51) Int. Cl.

| | |
|---|---|
| *B29C 48/06* | (2019.01) |
| *B29C 48/154* | (2019.01) |
| *B29K 105/16* | (2006.01) |
| *B29L 31/34* | (2006.01) |
| *H05B 3/18* | (2006.01) |

(52) U.S. Cl.

CPC ............ *H05B 3/18* (2013.01); *B29K 2105/16* (2013.01); *B29L 2031/3462* (2013.01); *H05B 2203/007* (2013.01); *H05B 2203/01* (2013.01); *H05B 2203/017* (2013.01); *H05B 2203/02* (2013.01)

(56) References Cited

U.S. PATENT DOCUMENTS

| | | | | |
|---|---|---|---|---|
| 4,309,596 | A | | 1/1982 | Crowley |
| 4,429,213 | A | * | 1/1984 | Mathieu .................. F24H 1/142 |
| | | | | 428/920 |
| 4,459,473 | A | * | 7/1984 | Kamath ................. H05B 3/146 |
| | | | | 219/505 |
| 4,547,658 | A | | 10/1985 | Crowley |
| 4,650,972 | A | | 3/1987 | Cunningham |
| 4,733,059 | A | | 3/1988 | Goss et al. |
| 4,908,156 | A | | 3/1990 | Dalle et al. |
| 4,922,083 | A | | 5/1990 | Springs et al. |
| 5,111,032 | A | * | 5/1992 | Batliwalla ................ H05B 3/56 |
| | | | | 219/544 |
| 6,005,232 | A | | 12/1999 | Janvrin et al. |
| 6,288,372 | B1 | | 9/2001 | Sandberg et al. |
| 6,564,011 | B1 | | 5/2003 | Janoff et al. |
| 6,943,319 | B2 | | 9/2005 | Jones |
| 7,566,849 | B2 | | 7/2009 | O'Connor |
| 8,212,191 | B2 | | 7/2012 | Sopory et al. |
| 8,525,084 | B2 | | 9/2013 | O'Connor |
| 9,103,181 | B2 | | 8/2015 | Invierno |
| 10,231,288 | B2 | | 3/2019 | Kiss et al. |
| 10,278,265 | B2 | | 4/2019 | Heiligenstein |
| 10,375,767 | B2 | | 8/2019 | Kazemi et al. |
| 10,470,251 | B2 | | 11/2019 | Kazemi et al. |
| 2005/0167134 | A1 | | 8/2005 | Charron |
| 2011/0060390 | A1 | | 3/2011 | Kim et al. |
| 2014/0103938 | A1 | | 4/2014 | Jones |
| 2014/0238968 | A1 | | 8/2014 | Lee |
| 2016/0105930 | A1 | * | 4/2016 | Kiss ......................... H05B 3/12 |
| | | | | 219/544 |
| 2017/0318626 | A1 | * | 11/2017 | Kazemi .................... H05B 3/56 |
| 2018/0220495 | A1 | | 8/2018 | Jenkins et al. |
| 2018/0270908 | A1 | | 9/2018 | Kazemi et al. |
| 2019/0141788 | A1 | | 5/2019 | Kazemi et al. |

OTHER PUBLICATIONS ptonline.com/articles/plastics-that-conduct-heat,2001 (Year: 2001).*
http://hyperphysics.phy-astr.gsu.edu/hbase/Tables/thrcn.html (Year: 2018).*
Ngo et al., Thermal conductivity of transparent and flexible polymers containing fillers: A literature review, International Journal of Heat and Mass Transfer, vol. 98, 2016, pp. 219-226 (Year: 2016).*
NVent RAYCHEM QTVR Self-Regularing Heating Cable, CID1, specification sheet, Copyright 2020 nVent, 2 pages.
NVent RAYCHEM MI Series Alloy 825 XMI-A hax Heating Cable, specificatino sheet, Copyright nVent, 7 pages.

* cited by examiner

SELF-REGULATING HEATER CABLE WITH BUFFER LAYER

CROSS-REFERENCE TO RELATED APPLICATIONS

This application is a nonprovisional claiming the benefit of priority from U.S. Prov. Pat. App. Ser. No. 62/866,973, filed under the same title on Jun. 26, 2019, and incorporated in its entirety herein by reference.

BACKGROUND OF THE INVENTION

Conventional heating devices such as heater tapes and heater cables rely on resistive heating of a dissipative element such as a resistive wire. Certain conventional heating tapes and cables are self-regulating, namely, they are configured to maintain a surface (e.g., of a pipe or walkway) to which they are applied at a roughly constant temperature regardless of changes in ambient conditions while also protecting against excess heat generation in the case of unintended flows of excess currents due to short-circuits, etc. Such self-regulating heating devices frequently employ conductive polymeric materials which expand when heated, increasing their electrical resistance and thereby reducing their heat output in response to overheating. Similarly, such materials contract when cooled, decreasing their electrical resistance and thereby increasing their heat output in response to undereating.

Conventional self-regulating heater cables have disadvantages. For example, as will be made clear from the figures and accompanying description, the electrical contacts between the self-regulating heating elements and the metal wires used to supply power to them may be fragile. Over time, due to mechanical stresses and other factors, the electrical contacts may weaken, causing the heater cable to perform poorly or fail. The self-regulating heating elements may also be subject to degradation due to oxidation and/or the metal wires may be exposed. Certain conventional self-regulating cables use strands of polymeric material wound about a core comprising electrical supply wires and a spacer as the self-regulating heating element to save weight and manufacturing costs compared to monolithic cables. Such conventional self-regulating cables may have various gaps within them caused by the variation in height between windings of the strands over the supply wires. These gaps impede optimal heat transfer from the heating elements within the cable to the outside of the cable in contact with a workpiece to be heated. This sub-optimal heat transfer reduces efficiency and also causes components of the cable to operate at elevated temperatures, which may shorten the lifespan of those components.

BRIEF SUMMARY

In one embodiment, a self-regulating heater cable assembly comprises first and second power supply wires configured to carry electrical power and separated by a solid spacer; a self-regulating heating element in electrical contact with the first and second power supply wires; a substantially solid electrically-insulating buffer layer in thermal contact with the heating element; and a cable jacket including a polymeric outer surface and an inner metallic sheath surrounding the buffer layer and in thermal contact with the buffer layer;

The power supply wires and the heating element are arranged so that, when a voltage differential is established between the first and second power supply wires, an electrical current flows through the heating element and between the first and second power supply wires; the buffer layer surrounds the heating element, the power supply wires, and the spacer; and the buffer layer comprises a polymeric material that has a thermal conductivity greater than air at standard temperature and pressure.

In some embodiments, the buffer layer may further comprise one or more particulate additives disposed within the buffer layer so that the thermal conductivity of the buffer layer is different from a thermal conductivity of the polymeric material. At least one particulate additive may comprise one of the following: alumina, boron nitride, carbon black, magnesium oxide, sand, silica, and glass.

In one embodiment, the buffer layer may be a porous material incorporating either voids or pockets containing trapped gasses.

In another embodiment, a method of manufacturing a self-regulating heater cable assembly comprises providing substantially parallel lengths of first and second power supply wires separated by a solid spacer; forming a first subassembly by fixedly coupling a self-regulating heating element in electrical contact with the first and second power supply wires; and surrounding the first subassembly with a substantially solid electrically-insulating polymeric buffer layer in thermal contact with the heating element to form a second subassembly; and surrounding the second subassembly with a cable jacket including a polymeric outer surface and an inner metallic sheath surrounding the buffer layer and in thermal contact with the buffer layer to form said heater cable assembly.

The power supply wires and the heating element are arranged such that the first and second power supply wires are coupled electrically to each other through the heating element to and the buffer layer has a thermal conductivity greater than the thermal conductivity of air at standard temperature and pressure.

In one embodiment, surrounding the first subassembly with buffer layer may comprise applying the buffer layer to the first subassembly in an extrusion process including one of a positive-pressure-extrusion procedure and a vacuum-extrusion procedure.

In another embodiment, surrounding the first subassembly with the buffer layer may comprise supplying as the buffer layer, a polymeric material incorporating a particulate additive. The particulate additive may comprise one or more of: alumina, boron nitride, carbon black, magnesium oxide, sand, silica, and glass.

In another embodiment, surrounding the first subassembly with buffer layer may comprise introducing either voids or pockets containing trapped gasses into the buffer layer during the extrusion process.

The above features and advantages of the invention will be better understood from the following detailed description taken in conjunction with the accompanying drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

Embodiments disclosed herein address shortcomings of prior art self-regulating heater cables by adding a buffer layer which encapsulates the heating element and also fills air gaps within the heater cable, thereby improving the efficiency of heat transfer to the outside of the cable. The buffer layers disclosed herein also provide heater cables with improved mechanical robustness and protection against oxidation and other failure modes, as will be described further below, after describing elements of an example conventional self-regulating heater cable.

Figure 1A:
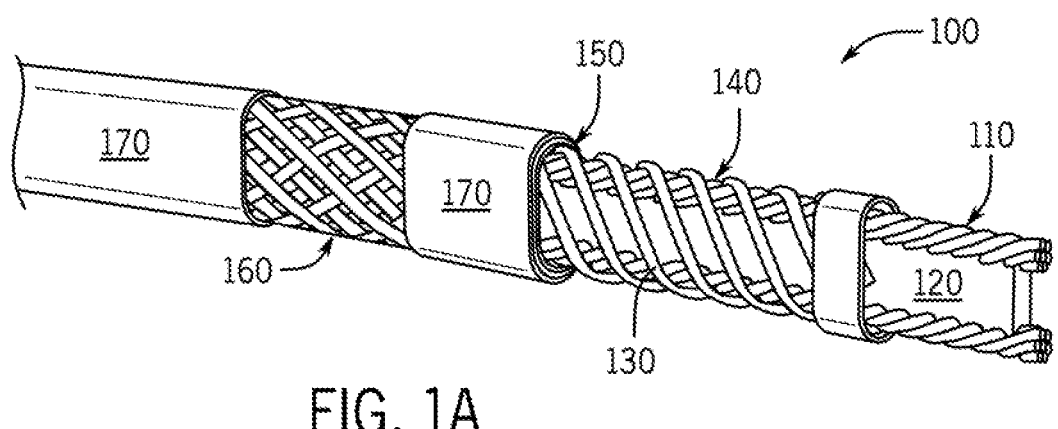
FIG. 1A is a top perspective view of an example self-regulating heater cable.

FIG. 1A shows an example self-regulating heater cable 100 with portions cut away to expose components of the cable 100 within various layers. The heater cable 100 includes power supply wires 110, separated by a solid, non-conductive spacer 120. The power supply wires 110 may be solid conductors or formed from individual wires braided together. The power supply wires 110 are shown as solid wires for purposes of illustration only and it will be understood that any supply wires suitable for a resistive heating application (such as braided wire bundles, as a non-limiting example) may be used. A self-regulating heating element 130 is shown wrapped around (and in contact with) the power supply wires 110, in a spiral or helical configuration. The windings of the heating element 130 are spaced apart, forming gaps 140 between consecutive windings. In embodiments such as the heater cable 100, the heating element 130 may be wound around the power supply wires 110 and spacer 120, as shown in FIG. 1A, such that the gaps 140 are substantially wider than the heating element 130.

The heating element 130 of the heater cable 100 is electrically conductive and the heater cable 100 is assembled such that the heating element 130 is in both electrical and mechanical contact with the power supply wires 110. During assembly of the heater cable 100, electrically-conductive ink or a similar electrically-conductive material (e.g., silver paint, conductive epoxy) is applied to the power supply wires 110 to facilitate electrical contact between the heating element 130 and the power supply wires 110. It should be understood that the heating element 130 may be constructed of any material or composition of materials known or later developed for use in self-regulated resistive heating applications. For example, the heating element 130 may be a solid-core strand or plurality of polymeric strands or fibers which are bundled together. Notably, configurations of the heating element 130 similar to those shown herein may provide reduced costs and greater ease of manufacturing over other designs such as monolithic heating elements formed to completely encapsulate the power supply wires 110.

The power supply wires 110, spacer 120, and heating element 130 are encircled by an inner jacket 150. The inner jacket 150 is encircled in turn by a ground layer 160. The ground layer 160 may comprise a braid of individual wires, or any other suitable material or composition of materials with sufficient electrical and thermal conductivity, such as foils and other structures suitable for conducting heat and protecting heating cables against punctures and other damage. Finally, the entire assembly is encircled by an outer jacket 170.

During operation of the heater cable 100, a voltage is applied between the two power supply wires 110 (i.e., establishing a voltage differential between the power supply wires 110), causing current to flow between the two power supply wires 110 via the heating element 130, thereby generating heat by resistive dissipation. Heat is transferred by radiation and conduction from the heating element 130 through the intervening layers of the heater cable 100 to the outer jacket 170. The ground layer 160 may be connected to a ground fault protection device to protect against ground faults and may also help the heater cable 100 to deliver heat uniformly to the outer jacket 170 and ultimately to a surface to be heated. The inner jacket 150 can be an electrically insulating layer preventing the ground layer 160 from creating a short circuit path between the two power supply wires 110 substantially bypassing the heating element 130.

Figure 1B:
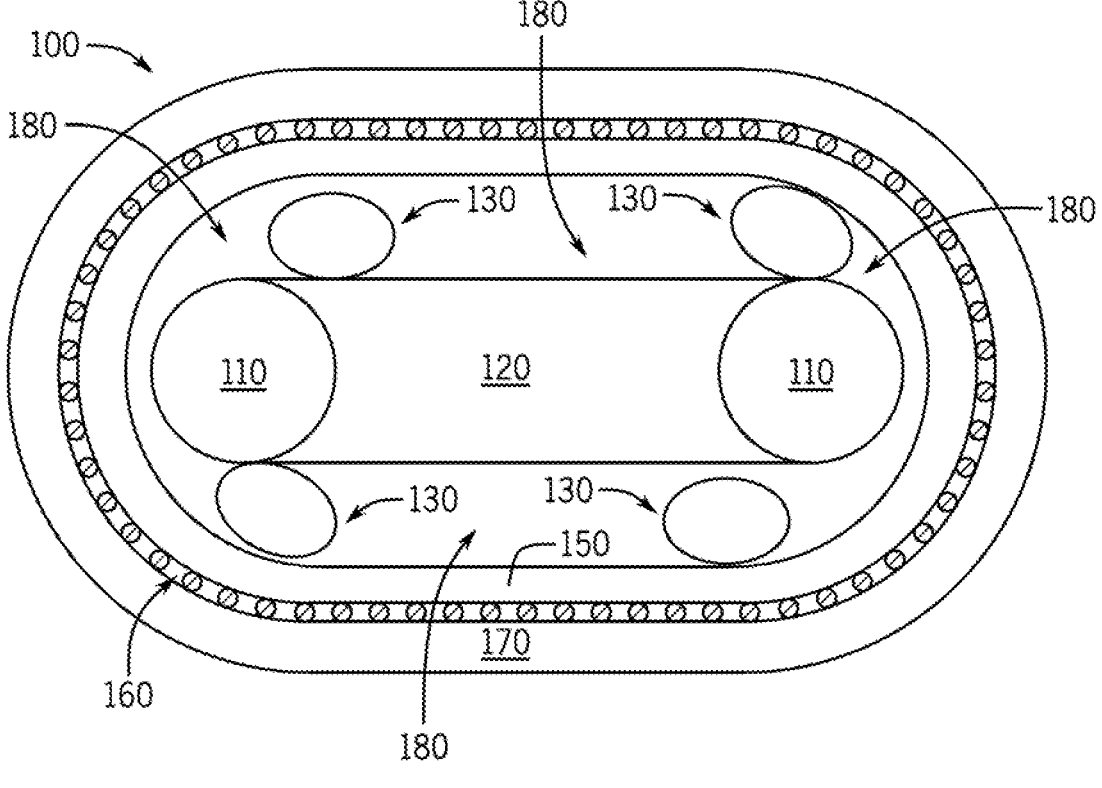
FIG. 1B is a front cross-sectional view of a profile of the heater cable of FIG. 1A.

Referring to FIG. 1B, an inner jacket 150 formed with common melt-extrusion techniques has a generally oval-shaped cross-section that seals in the gaps 140 of FIG. 1A to create one or more voids 180 formed by the windings of the heating element 130 and the inner jacket 150. A void 180 can be filled with air, which can affect the operation of the heater cable 100. For example, air can reduce thermal conductivity within the voids 180 relative to other parts of the cable 100; also, air is subject to dielectric breakdown, and the power of the cable 100 might need to be reduced to avoid this.

Figure 2:
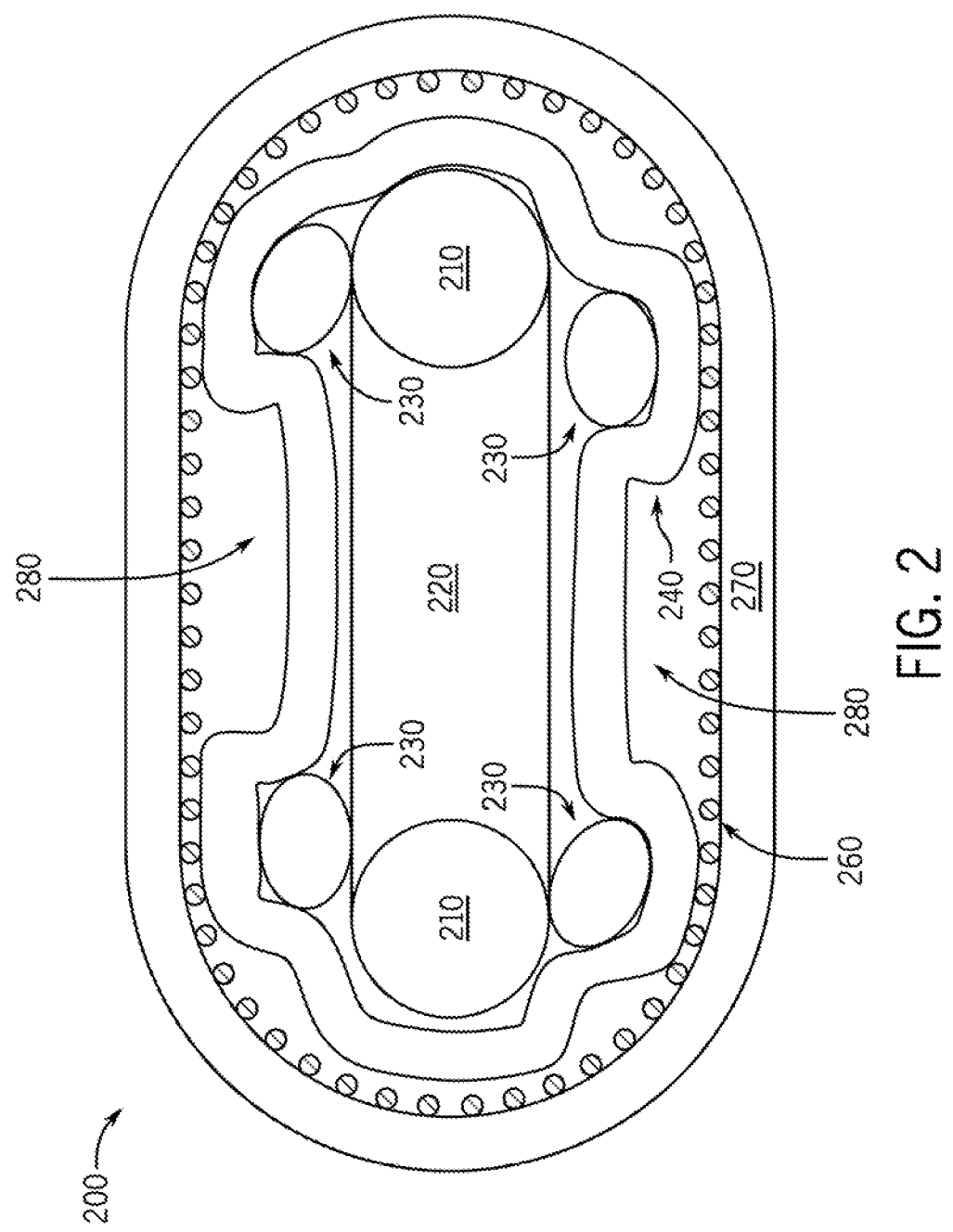
FIG. 2 is a front cross-sectional view of a profile of another example self-regulating heater cable in accordance with the present disclosure.

FIG. 2 shows a cross-section of another embodiment of a heater cable 200, having the same components of the described heater cable 100 of FIGS. 1A-1B except that the heater cable 200 features a buffer layer 240 in accordance with embodiments of the disclosure. The buffer layer 240 is applied over the supply wires 210, spacer 220, and heating element 230 (as described above), via a vacuum extrusion or similar process. Due to the manufacturing process used, the buffer layer 240 is pulled into the gaps between windings of the heating element 230, in some embodiments contacting the surfaces of the heating element 230 and spacer 220. Generally, in some embodiments, the buffer layer 240 can comprise a polymeric material that has a thermal conductivity greater than air at standard temperature and pressure, as further discussed below.

In this embodiment, the buffer layer 240 can be considered to replace an inner jacket (e.g., oval inner jacket 150 of FIGS. 1A-1B) of the heater cable. The buffer layer 240 can comprise materials identical or similar to those typically used in an insulating or semiconductive inner jacket, and/or other materials suitable for a buffer layer as described herein. Thus, in one embodiment, the buffer layer 240 of FIG. 2 comprises the inner jacket 150 of the cable 100, applied via vacuum extrusion instead of melt extrusion. Once the ground layer 260 and outer jacket 270 (as described above) are applied over the buffer layer 240, voids 280 may be formed between the buffer layer 240 and the outer jacket 270; these voids 280 may be smaller than the voids 180 of the cable 100, and they may be bounded by different materials, but nevertheless they can have similar effects on the performance of the heater cable 200.

Figure 3:
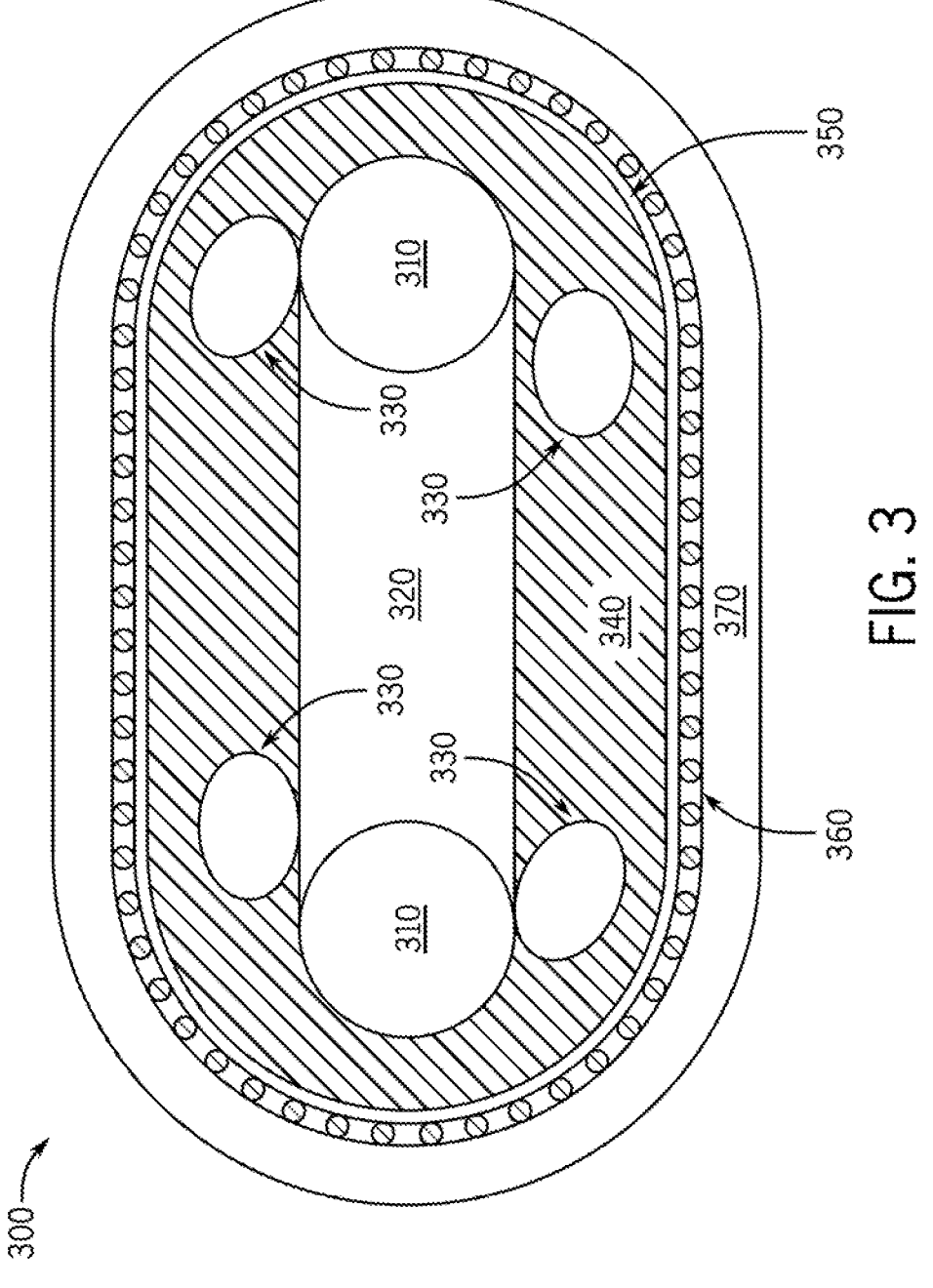
FIG. 3 is the front cross-sectional view of a profile of yet another example self-regulating heater cable in accordance with the present disclosure.

FIG. 3 shows a cross-section of another embodiment of a heater cable 300, taken at the same slice across the heater cable 300 as the previous Figures. Similar to the example conventional heater cable 100, the heater cable 300 has power supply wires 310 held apart by a spacer 320, and encircled by a heating element 330 (visible in FIG. 3 as cross-sectional winding segments). The heater cable 300 has an inner jacket 350 and, furthermore, comprises a buffer layer 340 surrounding and encapsulating the heating element 330, spacer 320, and supply wires 310. In embodiments such as the heater cable 300, the buffer layer 340 may be applied to a prefabricated assembly (formed by the power supply wires 310, spacer 320, and heating element 330) using a pressure-driven extrusion process. This process compresses the extruded material to fill the gaps between windings of the heating element 330, leaving a substantially smooth and uniform outer surface of the buffer layer 340. The inner jacket 350, ground layer 360, and outer jacket 370 can then be applied over the other components as described above. In some embodiments, however, (for example, depending on the composition of the buffer layer 340), the heater cable 300 may not include an inner jacket 350.

The use of a buffer layer such as the buffer layer 340 to encapsulate the heating element 330 can provide enhanced performance for power output with small geometry, elevated heat output, protection against ingress of moisture, and greater dielectric strength between the power supply wires as compared to conventional self-regulating heater cables, while retaining key product features such as flexibility, ease of stripping, and ease of installation. The buffer layer 340 can be a gel-like substance, flexible polymer, elastomer, thermoplastic, a tractable polymer, or a grease that softens or melts below the operating temperature of the heating element. Specific materials include crosslinked and non-crosslinked polyolefin resins, such as filled polyethylene resin, or a high flow thermoplastic such as MFA 1041, as non-limiting examples. The buffer layer 340 acts as a dielectric barrier to coat or seal around the power supply wires 310 and to reduce or eliminate gaps (such as the gaps 140 shown in FIGS. 1A-1B) in the heater cable 300 between the heating element 330, power supply wires 310, and spacer 320.

For example, the buffer layer 340 can be made from a low-modulus gel or rubbery elastomer that has a high cohesive strength for sealing. The buffer layer 340 can also be made from a thermoplastic such as a polyolefin derivative, which at elevated temperatures can soften or flow to maintain a seal. The buffer layer 340 can also be made from a polymer that does not soften significantly or flow, but when formed in a cable such as the heater cable 300, effectively seals or coats the heating element 330, acting as a dielectric and eliminating or reducing gaps (such as the gaps 140). This sealing can help prevent the power supply wires 310 becoming exposed to the surrounding environment or to other conductive devices in proximity to the wires 310. The buffer layer 340 also prevents water ingress by reducing or eliminating gaps and thus a potential pathway for water to enter from a breach in the outer jacket 370, at a junction, splice, or end seal of the heater cable 300.

Replacing or reducing gaps with a buffer layer such as the buffer layer 340 made from a material having higher thermal conductivity than air (which may be measured under standard temperature and pressure, or other conditions) results in better heat transfer from the heating element 330 to the external surface of the outer jacket 370 when compared with conventional heater cables, allowing for greater temperature and power output, as well as reducing the temperature of the heating element 330 due to the enhanced thermal conduction. Since the heating element 330 can conduct more heat than the heating element 130, for example, it can be operated at a lower temperature which in turn results in a longer expected product lifetime (experimental validation results will be discussed below in connection to FIG. 4). The buffer layer material can even be chosen to have an especially high thermal conductivity for this purpose. In addition, the buffer layer 340 can also serve as an oxygen barrier, reducing thermo-oxidative aging of the heating element 330 and additives used within it such as carbon black.

As indicated above, the buffer-layer material may be chosen to achieve various desired effects, including a particular level of thermal conductivity. The properties of the buffer-layer material may be further tuned by the incorporation of other materials including various particulate fillers or additives. For example, in some embodiments, by including certain additives, the thermal conductivity of the buffer layer may be different (e.g., greater than) a thermal conductivity of the base polymeric material alone. Non-limiting examples of such fillers are carbon black, alumina, boron nitride, magnesium oxide, sand, silica, solid or hollow glass spheres, etc. Additionally, gasses may be introduced into the buffer layer during processing to form small pores, voids, or trapped gas pockets within the buffer layer. By varying the volume of fillers and/or the porosity of the buffer-layer material, various properties of the buffer-layer material may be tuned, including (as non-limiting examples) thermal conductivity, electrical conductivity, and dielectric strength. Notably, precisely controlling the thermal conductivity of the buffer-layer material enables the heat output of a heater cable with an otherwise fixed design to be varied. Thus, a manufacturer may supply heater cables for multiple applications with different heat output requirements by simply varying composition of the buffer-layer material(s) without the need to alter the dimensions of the heater cable or of its other constituent components (e.g., the size, composition, and arrangement of heating elements such as the heating element 330, or parameters related to the power supply wires, and so on).

As noted above, in some embodiments, the heater cable 300 can have an inner jacket 350 disposed between the buffer layer 340 and the ground layer 360. In such embodiments, when the inner jacket material is a high temperature fluoropolymer, compositions of the buffer layer 340 may be selected to account for the presence of the inner jacket 350, and these selections may be the same as, or different than, buffer layer 340 material selections for embodiments of the heater cable 300 lacking the inner jacket. The buffer layer 340 may contact the inner jacket 350, and so its composition can be selected so the buffer layer 340 does not hasten degradation of the inner jacket 350; additionally, the buffer layer 340 may be composed of materials giving a high thermal conductivity, so as not to adversely impact heat production of the cable. In some embodiments, an inner jacket 350 is formed during an extrusion process; correspondingly, materials, and compositions of materials, for the buffer layer 340 may have a viscosity that is sufficiently high to ensure ease of handling at the process temperature during the extrusion. In such instances, the buffer layer 340 can be composed of a suitable filled polyethylene-based resin that has high thermal conductivity, such as T733 or other suitable materials (e.g., having a thermal conductivity up to about 0.8 Watts per meter Kelvin (W/mK) isotropically, or 2.0 W/mK anisotropically). Preferably as well, the material(s) forming the buffer layer 340 can be halogen-free so they do not release dangerous halogen gas when burned. Materials such as the PolyOne ECCOH materials will not flow rapidly at the extrusion temperature during the relatively short exposure to such high temperatures during co-extrusion or application of an inner jacket 350 due to their relatively high levels of filler materials. The manufacturing process to incorporate a sealing layer or buffer layer such as the buffer layer 340 between heating elements (such as the heating element 330) and an inner jacket 350 can be applied prior to the inner-jacket extrusion, or at the same time as the inner-jacket extrusion (e.g., in a co-extrusion process).

It should be understood that different embodiments may be preferred for various reasons, including thermal performance, durability, manufacturing cost, weight, and so on. For example, heating cables can be manufactured according to the description of the heater cable 300 of FIG. 3 using a positive-pressure extrusion process having heating power outputs of about 8-25 W/ft. depending on the production rate. In another example, heating cables can be manufactured according to the description of the heater cable 200 of FIG. 2 using a vacuum extrusion process having heating power outputs of about 5-20 W/ft depending on the production rate.

Figure 4:
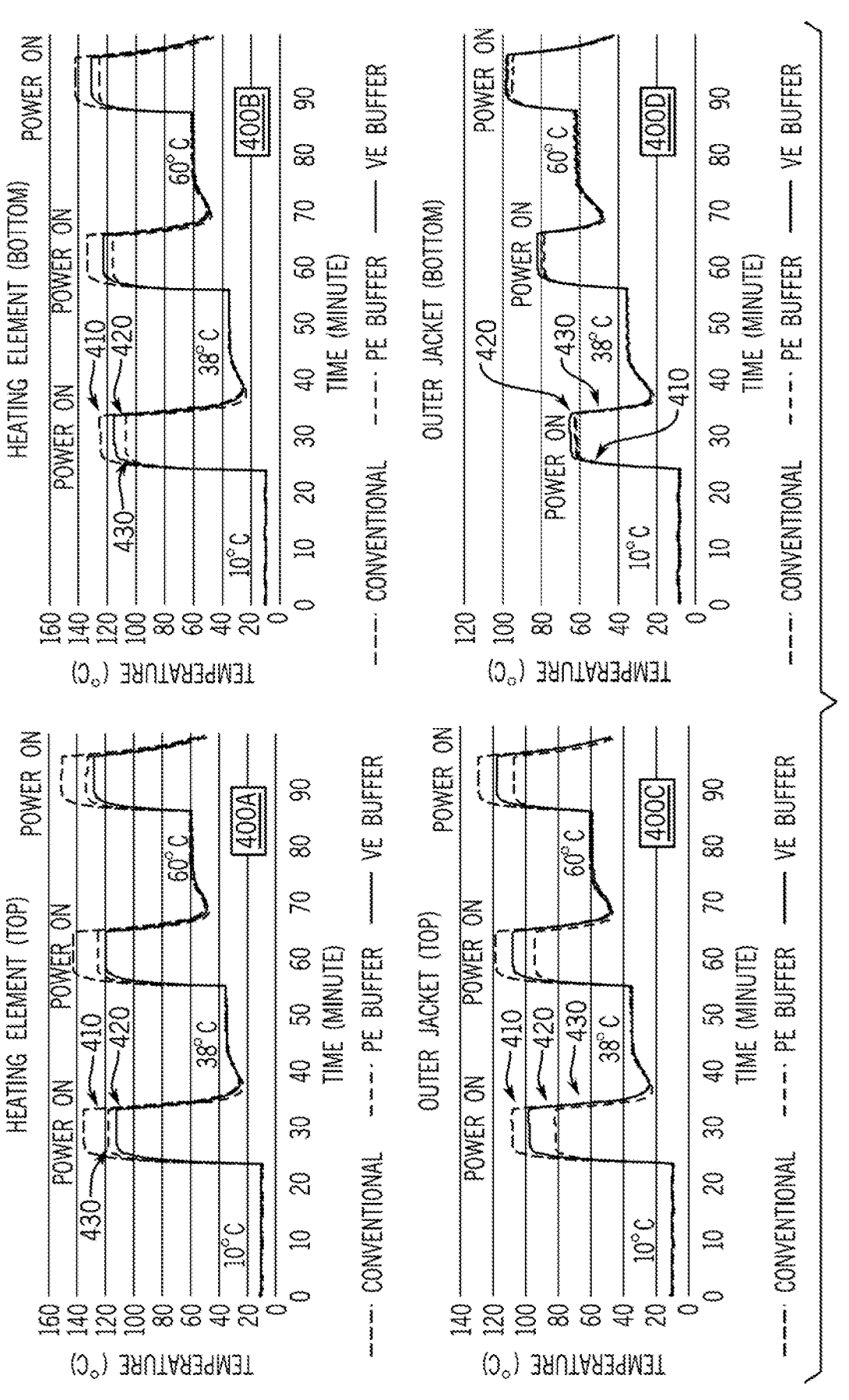
FIG. 4 is a series of graphs depicting performance testing of heater cables according to various embodiments disclosed herein.

FIG. 4 is a series of plots showing the result of power-cycling tests comparing conventional heater cables with heater cables provided with buffer layers as disclosed herein. Each plot shows temperature measured at a particular location versus time as the heater cables are powered on and off. In particular, the heater cables were placed in contact with a test object and temperature was measured at various locations of the cables. The bottom of the outer jacket (such as the outer jackets 170, 270, 370) is the surface in direct contact with the test object. The bottom of the heating element (such as the heating elements 130, 230, 330) is the portion of the heating element closest to the object. The top of the heating element is the portion of the heating element farthest from the object and the top of the outer jacket is the portion of the outer jacket farthest from the test object, exposed to the ambient atmosphere. Plots 400A, 400B, 400C, and 400D respectively represent measurements made at the top and bottom of the heating element, and the top and bottom of the outer jacket. Each plot shows results for a conventional cable (curves 410), a heater cable similar to heater cable 300 with a positive-pressure-extruded buffer layer ("PE Buffer," curves 420), and a heater cable similar to the heater cable 200 with a vacuum-extruded buffer layer ("VE Buffer," curves 430).

It will be appreciated that the measured temperatures at the bottom of the outer jacket (such as the outer jackets 170, 270, 370), which are the areas in contact with the test object, are nearly indistinguishable (see plot 400D). However, the improved heat transfer characteristics of the buffer layers 240 and 340 allow the other areas of the improved heater cables to operate at lower temperatures while achieving the same heating performance. For example, the temperatures at the top of the heating elements (such as the heating elements 230, 330) are cooler by approximately 20° C. as compared to the temperature at the top of the heating element (such as heating element 130) for the conventional cable in plot 400A. Similarly, the bottoms of the heating elements (see plot 400B) and tops of the outer jackets (see plot 400C) of the improved heater cables (such as the heater cables 200, 300) remain cooler than those areas of a conventional cable (such as the heater cable 100) while providing equivalent heating performance.

As demonstrated by the test results of FIG. 4, the performance of improved heater cables disclosed herein can depend on how the buffer layer (such as the buffer layers 240, 340) is configured with respect to other components of a heater cable. Alternative embodiments with various buffer layer configurations may be employed to obtain desired mechanical characteristics, thermal characteristics, or relative manufacturability and manufacturing cost and will now be described with reference to FIGS. 5-8A.

Figure 5:
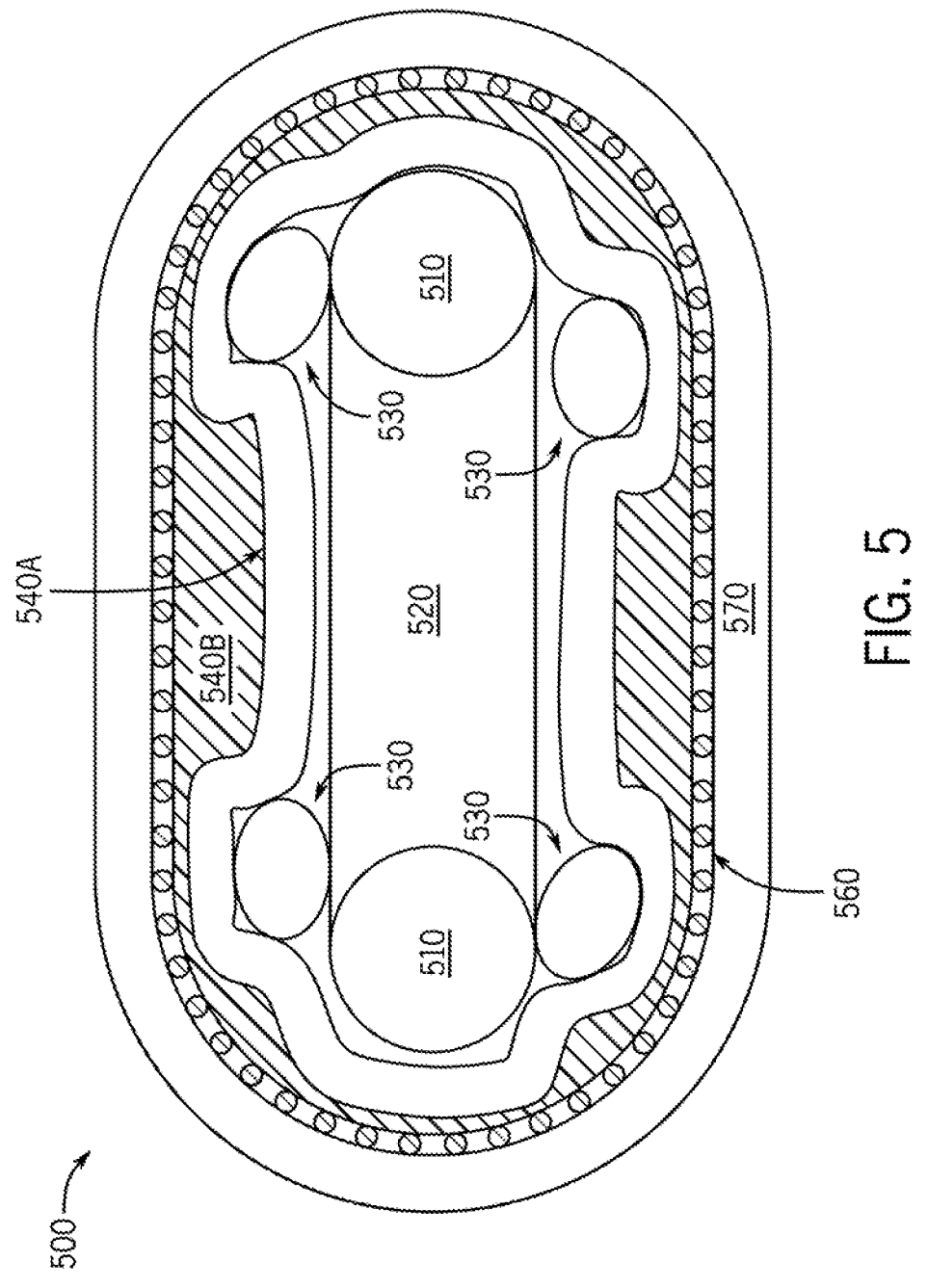
FIG. 5 is a front cross-sectional view of a profile of still another example self-regulating heater cable in accordance with the present disclosure.

For instance, heater cables may include multiple buffer layers, as illustrated by the improved heater cable 500 shown in FIG. 5. As an example, the improved heater cable 500 includes: a vacuum-extruded first buffer layer 540A identical or similar to the buffer layer 240 of the heater cable 200 described above, applied over and in contact with the supply wires 510, spacer 520, and heating element 530; and, a positive-pressure-extruded second buffer layer 540B, analogous to the buffer layer 340 of heater cable 300, applied over and compressed into contact with the first buffer layer 540A in order to shrink or eliminate all gaps and potential voids. The buffer layer 540A can be electrically insulating so as not to short-circuit the heating element 530. Since the buffer layer 540A is insulating, the buffer layer 540B may be electrically conductive if desired. The ground layer 560 and outer jacket 570 are then applied as described above.

Figure 6A:
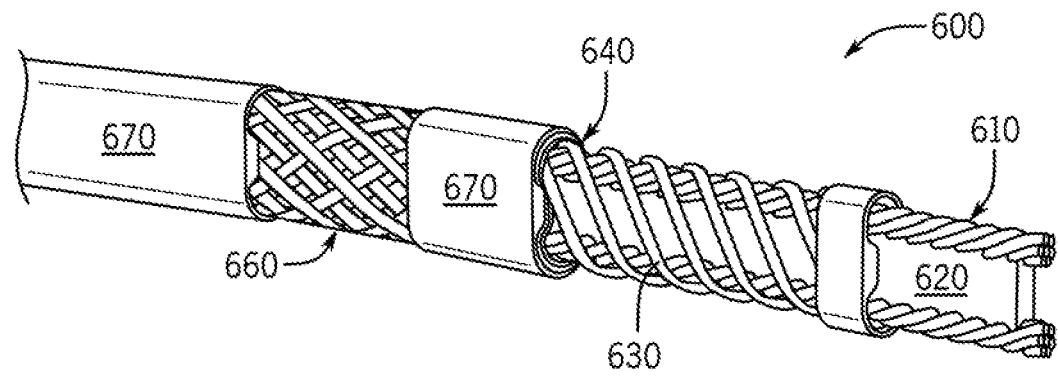
FIG. 6A is a top perspective view of still another example self-regulating heater cable in accordance with the present disclosure.
Figure 6B:
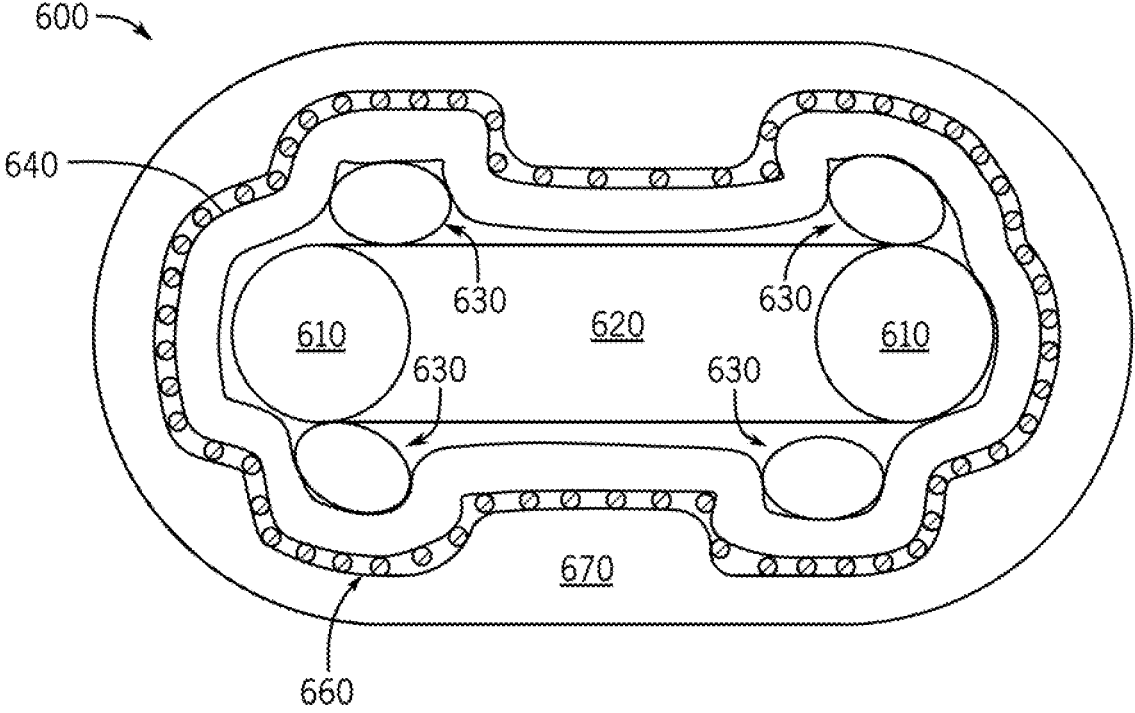
FIG. 6B is a front cross-sectional view of a profile of the heater cable of FIG. 6A.

Referring to FIGS. 6A and 6B, in some embodiments a self-regulating heater cable 600 can include a vacuum-extruded buffer layer 640 identical or similar to the buffer layer 240 of the heater cable 200 described above, applied over and in contact with the supply wires 610, spacer 620, and heating element 630; a ground layer 660 such as a conductive braid can be applied over the buffer layer 640, and then a pressure-extruded outer jacket 670 can be applied over the ground layer 660. During pressure extrusion, the material of the outer jacket 670 presses the ground layer 660 into conformance with the topography (i.e., into contact with the outer surface) of the underlying vacuum-extruded buffer layer 640, particularly within the gaps between windings of the heating element 630. The buffer layer 640 can be electrically insulating, comprising materials as described above with respect to FIG. 2, so as not to short-circuit the heating element 630. The outer jacket 670 can comprise materials in the example outer jackets described above, or in the example pressure-extruded buffer layers 340, 540B described above, or a combination of such materials.

Figure 7:
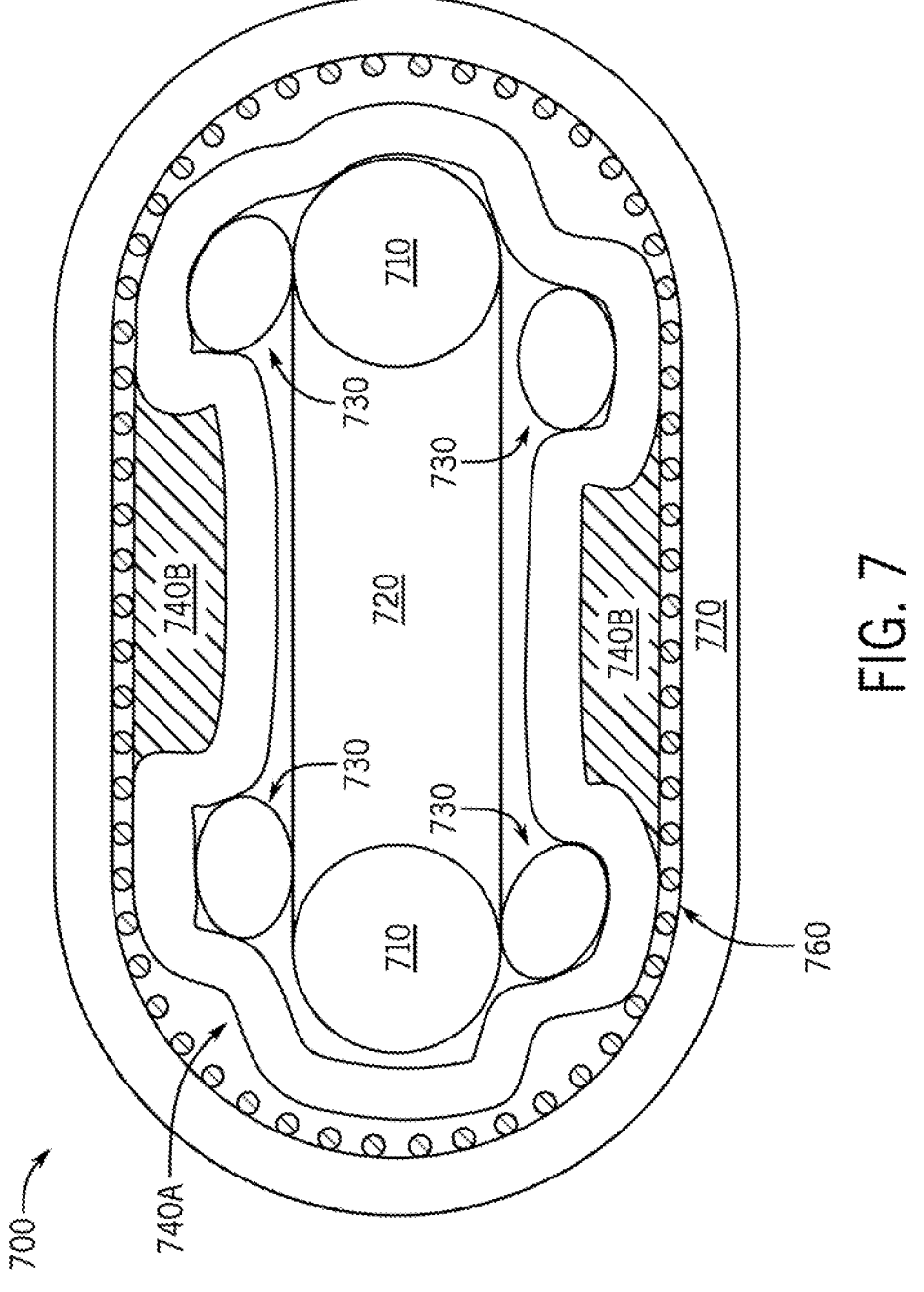
FIG. 7 is a front cross-sectional view of a profile of still another example self-regulating heater cable in accordance with the present disclosure.

In another embodiment, FIG. 7 illustrates an example self-regulating heater cable 700 including both a vacuum-extruded first buffer layer 740A applied over the supply wires 710, spacer 720, and heating element 730, and a second buffer layer 740B applied over at least a portion of the first buffer layer 740A. The first buffer layer 740A may be configured similarly to the vacuum-extruded buffer layers 340, 540A, and 640. The first buffer layer 740A may comprise a material having suitable thermal conductivity and suitably low electrical conductivity so that power supply wires 710 and heating element 730 are not short-circuited by the first buffer layer 740A. The second buffer layer 740B may be applied only over selected areas of the outer surface of the first buffer layer 740A. For example, as shown in FIG. 7, the second buffer layer 740B may be applied only within the larger top and bottom gaps between windings of the heating element 730; in particular, FIG. 7 shows the second buffer layer 740B entirely or substantially filling the gaps, thereby coming into contact with a ground layer 760 applied over the buffer layers 740A,B.

Because the first buffer layer 740A is electrically insulating, the second buffer layer 740B may have enhanced thermal conductivity and may be electrically conductive as well. In some embodiments, the second buffer layer 740B can be formed from materials that can flow into or be spread onto desired portions of the outer surface of the first buffer layer 740A; additionally or alternatively, the second buffer layer 740B can include electrically conductive and/or electrically non-conductive strands of material, covering the desired area and/or embedded within the flowable/spreadable material. Non-limiting examples of suitable materials for the second buffer layer 740B may include metal wires, fluoropolymer fibers, glass fibers, carbon fibers, silicone compounds, silicone compounds with additional materials included (e.g., sand, silica, alumina, boron nitride, et. al), thermal pastes or greases, aerogels, Thinset, other polymers with or without additives (e.g., carbon and glass fibers, sand, silica, alumina, boron nitride, magnesium oxide), polymers with voids, foams, etc., and combinations thereof.

Figure 8A:
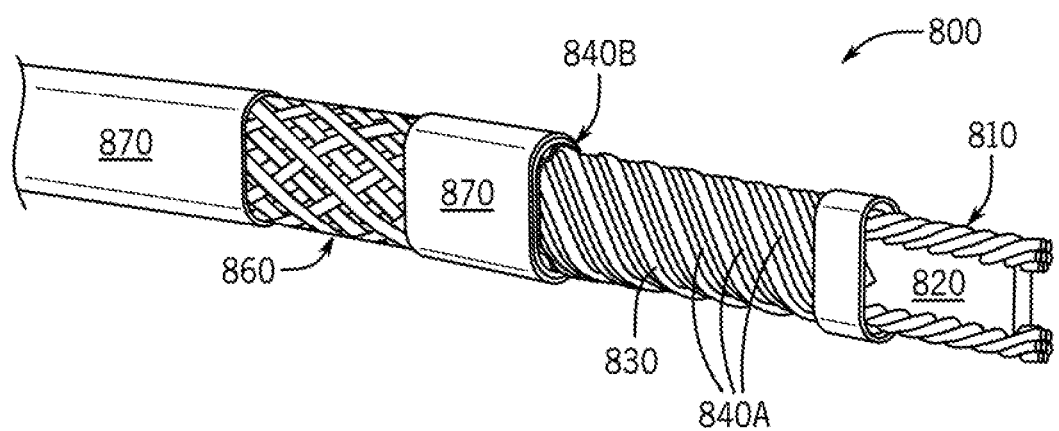
FIG. 8A is a top perspective view of still another example self-regulating heater cable in accordance with the present disclosure.
Figure 8B:
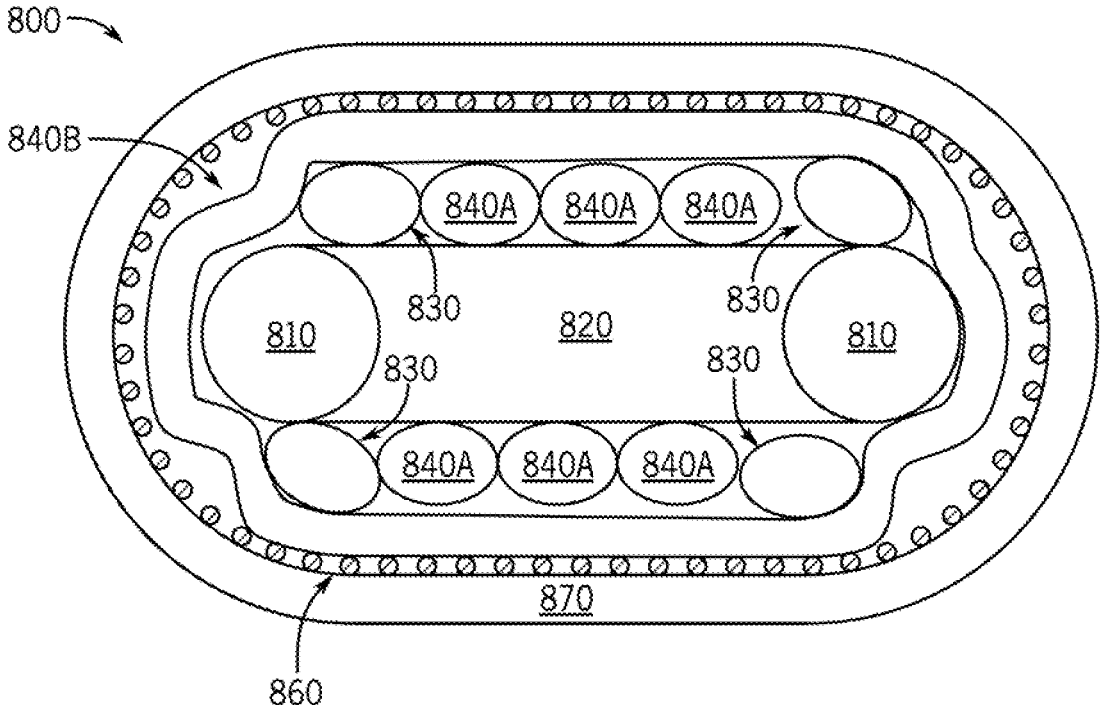
FIG. 8B is a front cross-sectional view of a profile of the heater cable of FIG. 68.

In another embodiment shown in FIGS. 8A and 8B, an improved heater cable 800 includes a buffer layer formed from a plurality of fibers 840A wound around the supply wires 810 and spacer 820, together with the heating element 830. For example, the buffer layer can include a selected number of fibers 840A disposed in the gaps between the windings of the heating element 830, the selected number being sufficient to substantially eliminate the gaps. In other words, the fibers 840A substantially fill the voids that would otherwise exist between the spacer 820, the windings of the heating element 830, and an inner jacket (e.g., inner jacket 150 of FIGS. 1A-1B) as described above. The fibers 840A may comprise a material having suitable thermal conductivity and suitably low electrical conductivity so that power supply wires 810 and heating element 830 are not short-circuited by the buffer layer 840A. Non-limiting examples of suitable materials for the buffer layer 840A include fluoropolymer fibers, fluoropolymer/carbon fibers, glass fibers, etc. Choosing buffer layers configured as wound fibers similarly to the buffer layer 840A can be advantageous to reduce manufacturing costs and/or increase the ease of manufacturing improved heater cables benefiting from the addition of one or more buffer layers as disclosed herein. In some embodiments, the heater cable 800 may further include a vacuum-extruded second buffer layer 840B applied over the supply wires 810, spacer 820, heating element 830, and first buffer layer (i.e., fibers 840A), and acting as a buffer layer or an inner jacket as described above. The heater cable 800 may further include a ground layer 860 and an outer jacket 870.

Generally, unless stated otherwise, a variety of general types of materials are suitable for buffer layers which contact heating elements as well as for outer jacket materials in the embodiments disclosed herein. Any suitable materials may be used to achieve the performance characteristics desired. In such cases, any number of outer jacket layers and buffer layer(s) may be made of the same material or similar materials or any number of layers may be made of different materials. Non-limiting examples of suitable materials may include fluoropolymers, fluoropolymers with one or more additives (e.g., carbon, glass fibers, silica, alumina, boron nitride, magnesium oxide, et al.), polymers with voids, foams, et al. Outer jacket layer materials may also include (silicones with or without various additives, including those disclosed previously).

As described above, generally, embodiments of the disclosure provide an improved self-regulating heater cable comprising substantially parallel lengths of first and second power supply wires separated by a solid spacer, a self-regulating heating element in electrical contact with the first and second power supply wires, one or more buffer layers over the first and second power supply wires, solid spacer, and heating element, (optionally) an inner jacket, and an outer jacket. The buffer layer(s) may be substantially solid, electrically insulate the heating material, have a thermal conductivity great than that of air at standard temperature and pressure, and/or be formed of a polymer with or without one or more additives and/or gaseous voids (in accordance with any of the examples listed above).

Accordingly, in some embodiments, a method of manufacturing a self-regulating heater cable assembly is provided. According to this method, substantially parallel lengths of first and second power supply wires, separated by a solid spacer, are provided. A first subassembly is formed by fixedly coupling a self-regulating heating element in electrical contact with the first and second power supply wires. As such, the power supply wires and the heating element are arranged so that the first and second power supply wires are coupled electrically to each other through the heating element. Furthermore, the first subassembly is surrounded with a substantially solid electrically-insulating polymeric buffer layer in thermal contact with the heating element to form a second subassembly. The buffer layer has a thermal conductivity greater than the thermal conductivity of air at standard temperature and pressure. Additionally, the second subassembly is surrounded with a cable jacket including a polymeric outer surface (outer jacket) and an inner metallic sheath (inner jacket) surrounding the buffer layer and in thermal contact with the buffer layer to form the heater cable assembly.

In accordance with the manufacturing method above, the buffer layer can be applied to the first subassembly in an extrusion process, such as a positive-pressure-extrusion procedure or a vacuum-extrusion procedure. Additionally, as discussed above, the buffer layer can comprise a polymeric material incorporating a particulate additive such as, but not limited to, one or more of alumina, boron nitride, carbon black, magnesium oxide, sand, silica, and/or glass. Voids or pockets containing trapped gasses can also be introduced into the buffer layer during the extrusion process.

Furthermore, in accordance with the manufacturing method above, applying the buffer layer to the first subassembly includes applying more than one buffer layer, such as a vacuum-extruded first buffer layer and a positive-pressure-extruded second buffer layer. Alternatively, in some embodiments, the buffer layer (or one of the multiple buffer layers) can comprise a plurality of fibers wound around the first and second power supply wires, filling gaps between windings of the heating element.

While there has been illustrated and described what is at present considered to be suitable example embodiments of the present invention, it will be understood by those skilled in the art that various changes and modifications may be made and equivalents may be substituted for elements thereof without departing from the true scope of the invention. The embodiments of the invention described herein are not intended to be exhaustive or to limit the invention to precise forms disclosed. Rather, the embodiments selected for description have been chosen to enable one skilled in the art to practice the invention. Therefore, it is intended that this invention not be limited to the particular embodiments disclosed, but that the invention includes all embodiments falling within the scope of the appended claims.

The invention claimed is:

1. A self-regulating heater cable assembly, the assembly comprising:
    first and second power supply wires configured to carry electrical power and separated by a solid electrically insulating spacer;
    a self-regulating heating element in electrical contact with the first and second power supply wires and converting electric current into thermal energy when the first and second power supply wires are energized, the heating element being spirally wound around the first and second supply wires and the spacer, and having a spacing that creates gaps between consecutive windings of the heating element;
    a conductive ground layer that couples the heater cable to electric ground, the ground layer surrounding and physically separated from the heating element and the first and second supply wires;
    an outer jacket surrounding the ground layer; and
    an electrically-insulating buffer layer disposed between the ground layer and the heating element and in thermal contact with the heating element, the buffer layer being extruded over the heating element to result in filling of the gaps between the windings of the heating element, the buffer layer comprising a polymeric material and having a thermal conductivity greater than air at standard temperature and pressure, and the buffer layer being porous and incorporating at least one of voids and pockets containing trapped gasses.

2. The assembly of claim 1, wherein the buffer layer further comprises one or more particulate additives disposed within the buffer layer so that the thermal conductivity of the buffer layer is greater than a thermal conductivity of the polymeric material; and
    wherein at least one particulate additive comprises one of alumina, boron nitride, carbon black, magnesium oxide, sand, silica, and glass.

3. The assembly of claim 1, wherein the buffer layer is applied to the assembly by pressure extrusion.

4. The assembly of claim 3, wherein the melt point of the polymeric material is below a maximum operating temperature of the heating element, the assembly further comprising an electrically insulating, thermally conductive inner jacket surrounding the heating element, the first and second supply wires, and the spacer, and physically separating the ground layer from the heating element.

5. The assembly of claim 4, wherein the inner jacket is applied to the assembly by vacuum extrusion, the inner jacket partially filling the gaps and contacting the heating element, and wherein the buffer layer is applied within the gaps to completely fill the gaps.

6. The assembly of claim 5, wherein the inner jacket surrounds the buffer layer.

7. The assembly of claim 4, wherein the buffer layer is applied in the gaps and fills the gaps, and wherein the inner jacket is applied over the buffer layer by vacuum extrusion.

8. The assembly of claim 1, wherein at least a portion of the buffer layer is applied to the assembly by vacuum extrusion.

9. The assembly of claim 8, wherein the buffer layer comprises:
    a first buffer layer comprising a plurality of fibers disposed in the gaps and filling the gaps and spirally wound around the spacer and the first and second supply wires adjacent the heating element; and
    a second buffer layer applied by vacuum extrusion over the spacer, the first and second supply wires, the heating element, and the first buffer layer.

10. The assembly of claim 1, wherein the buffer layer comprises a plurality of fibers disposed in the gaps and filling the gaps and spirally wound around the spacer and the first and second supply wires adjacent the heating element.

11. The assembly of claim 10, further comprising an electrically insulating, thermally conductive inner jacket surrounding the heating element, the first and second supply wires, and the spacer, and physically separating the ground layer from the heating element.

12. The assembly of claim 11, wherein the inner jacket is applied to the assembly by vacuum extrusion.

* * * * *